April 29, 1952 R. H. BEYER 2,594,536
FISHING ROD
Filed Feb. 23, 1946
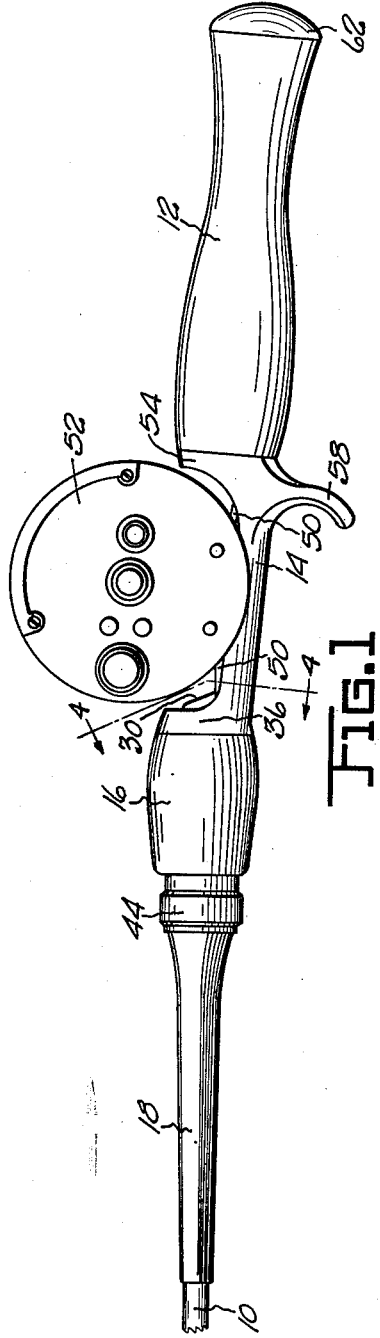
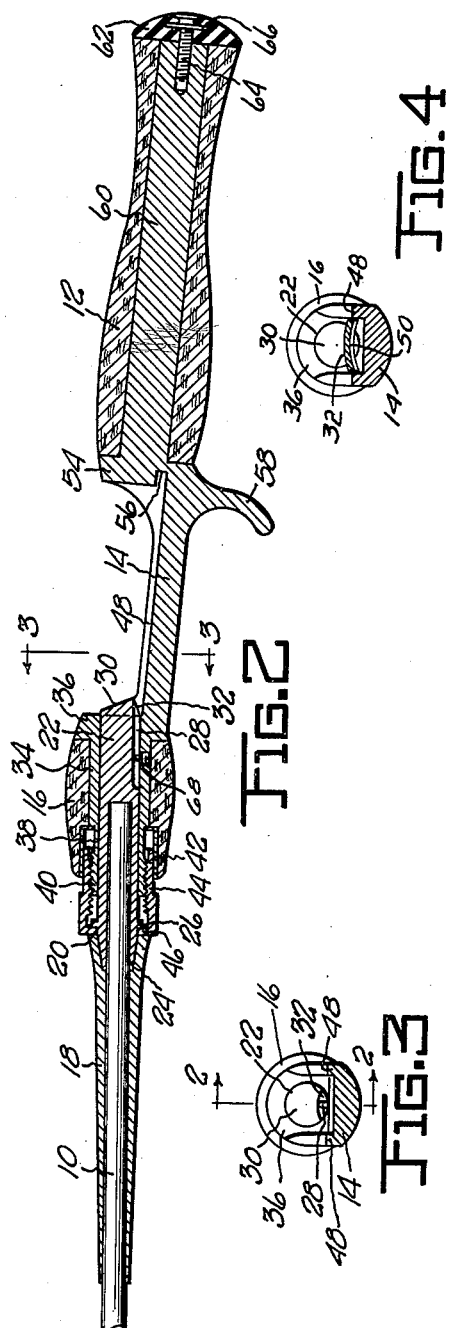
INVENTOR.
RAYMOND H. BEYER.
BY
Oltsch & Knoblock
ATTORNEYS.

Patented Apr. 29, 1952

2,594,536

UNITED STATES PATENT OFFICE 2,594,536

FISHING ROD

Raymond H. Beyer, South Bend, Ind., assignor to South Bend Bait Company, South Bend, Ind., a corporation of Indiana Application February 23, 1946, Serial No. 649,683

21 Claims. (Cl. 43—22)

The invention relates to improvements in fishing rods.

The primary object of the invention is to provide a fishing rod having a unit separable therefrom and constituting a hand grip and a reel seat, wherein a single element serves both to connect said unit to said rod and to anchor a fishing reel upon a reel seat.

A further object is to provide a fishing rod having a unit separably attached thereto and constituting a hand grip and a reel seat, wherein said rod cooperates with said reel seat to anchor a fishing reel on said reel seat.

A further object is to provide a fishing rod having an adjustable handle unit including a reel seat, wherein said rod may project in operative relation to said reel seat to anchor a reel base on said reel seat.

Other objects will be apparent from the description and appended claims.

In the drawing:

Fig. 1 is a fragmentary side view of the fishing rod with a fishing reel mounted thereon.

Fig. 2 is a longitudinal sectional view of the fishing rod taken on line 2—2 of Fig. 3.

Fig. 3 is a transverse sectional view taken on line 3—3 of Fig. 2.

Fig. 4 is a transverse sectional view similar to Fig. 3 but illustrating the engagement of the extension portion of the rod with the base plate of the reel to lock the latter upon the reel seat.

Referring to the drawing, which illustrates the preferred embodiment of the invention, the numeral 10 designates the flexible rod portion, 12 the handle, 14 the reel seat, and 16 a front hand grip of a fishing rod assembly. The flexible rod portion 10 may be of any conventional type, such as a solid steel rod as shown, a tubular steel rod, or a split bamboo rod. The rod is provided with the usual line guides (not shown) positioned at its tip and spaced along its length. The specific bar type steel rod illustrated has a tapered sleeve 18 encircling the same in spaced relation to its end and providing a shoulder 20 at its rear end. An extension portion or fitting 22 is mounted on the rear end of rod 10, being provided with a longitudinal bore within which the rod 10 is anchored or secured. The extension 22 has a tapered front end portion 24 which fits in a tapered socket in the sleeve 18. An annular rib 26 projects from the large diameter end of said tapered portion. A longitudinal groove 28 is formed in the rear end portion of extension 22. The rear end of the extension 22 is configured, being provided with an end face 30 slightly inclined with respect to a transverse plane, said face 30 extending for the major portion of the transverse dimension of said extension. At its lower rear end portion the extension 22 has a tapered or inclined face 32 extending at a slight angle relative to the axis of said extension. Extension 22 is preferably of circular cross-section as illustrated, but it may have any cross-sectional shape found suitable. Where said cross-section is non-circular, or in any case if desired, the groove 28 may be omitted.

The rod extension 22 fits snugly and slidably within a tubular guide member 34, which forms an integral part of the frame of the butt portion of the fishing rod which includes the base of the reel seat and the core of the handle. The member 34 is encircled by and mounts the front grip 16 of the rod, and terminates in an enlarged transverse flange 36 providing a shoulder against which the rear end of grip 16 abuts. A reduced thickness portion 38 is formed in member 34 intermediate its ends, and the outer end portion 40 of member 34 projects beyond the front edge of grip 16 and is externally screw threaded. A metal reinforcing sleeve 42 fits within an enlarged diameter portion of the bore at the front of grip 16 and provides an annular socket in which an internally screw threaded locking nut or sleeve 44 is rotatably received. The front portion of nut 44 has an inturned flange 46 which seats between the rear edge 20 of sleeve 18 and the rib 26 on extension 22. The nut 44 serves as the means for adjusting the relative longitudinal positions of the members 22 and 34.

The reel seat 14 comprises an elongated rigid metal bar or plate having a substantially flat upper surface and is off-set relative to member 34 so that extension 22 may be positioned above the front end portion thereof as shown in Fig. 2. The reel seat has longitudinal ribs 48 extending its sides and projecting above the upper surface. Ribs 48 are spaced apart a distance substantially equal to or slightly greater than the width of the base plate 50 of a fishing reel 52, whereby said base plate is confined against lateral displacement. The reel seat terminates in a transversely enlarged and upwardly projecting flange 54 similar to flange 36 of member 34 and spaced longitudinally therefrom a distance greater than the length of the reel base plate 50. Flange 54 has a notch 56 formed therein at the level of the upper surface of the reel seat to receive and anchor one end of the reel base plate 50. If desired, the reel seat may have a downwardly projecting finger-engaging hook 58 formed adjacent to its rear end as shown.

A handle shank 60 is formed integrally with and projects rearwardly from the flange 54 of the reel seat. The usual tubular hand grip 12, formed of cork or other suitable material, encircles said shank with its front edge bearing against flange 54. A handle butt 62, here shown as formed of rubber, although any other material found suitable may be used, is suitably secured to the handle. A screw 64 is here shown threaded in a bore in the end of shank 60, said screw having a head 66 imbedded in said butt 62.

In the manufacture of the rod, the rod portion 10 with its sleeve 18 and extension 22 and the nut 44 is formed as one assembly or unit, and the handle 12, reel seat 14 and hand grip 16 are formed as a second assembly or unit. The prefabricated units are assembled by fitting the extension 22 of the first unit into the tube 34 of the second unit; and the parts are held against separation and in the desired relative longitudinal adjustment by the engagement of nut 44 with the threaded portion 40 of tube 34. Where extension 22 is provided with a longitudinal groove 28, a transverse pin 68 mounted by tube 34 projects into said groove to hold the two units against relative rotation.

To mount reel 52 upon the rod, the nut 44 is first adjusted to retract the rear end of rod extension 22 from the reel seat, i. e. into tube 34. The base plate 50 of the reel can then be applied to the reel seat between the ribs 48 with its rear end fitting in notch 56. Nut 44 can then be rotated to project the extension 22 rearwardly outwardly beyond flange 36 to a position overlying and engaging the front end of reel base plate 50 and pressing or pushing said plate 50 firmly and solidly in notch 56. It will be noted that the surface 32 of the extension 22 engages the reel base and overlies and presses downwardly thereagainst to solidly lock the reel base against displacement by a wedge action, as best seen in Figs. 1 and 4. It will be observed that this interlocking engagement of the parts is sufficient to hold the rod against rotation relative to the reel seat, so that groove 28 and pin 68 may be dispensed with if desired. In this connection, and assuming said groove and pin are omitted, if the rod should rotate relative to the reel seat while the reel is removed from the reel seat, the parts will be returned to proper rotative relation automatically the next time the reel is mounted on the reel seat by virtue of the self-righting action and abutment of inclined face 32 against the reel base 50. This will insure proper alignment of the line guides upon the rod with respect to the reel position at all times in using the device.

The reel 52 is disconnected from the rod by simply backing the nut 44 on threads 40 until the fitting 22 is retracted into the guide 34, so that the reel base 50 is free for removal from the reel seat. If use of the rod is ended, the nut 44 may be backed off of the threads 40 completely, thereby permitting the handle unit to be pulled free from the rod unit for compact storage of the rod. This renders the device very simple to manipulate and avoids the necessity of separate operating means for the reel seat and for the rod joint as has heretofore been conventional.

The invention resides in the combination and arrangements of the parts as above described, and includes other specific embodiments within the spirit of the invention as described and within the scope of the appended claims.

I claim:

1. A fishing rod comprising an elongated flexible rod unit including a fitting at one end thereof, a handle unit including a reel seat and a rod socket, said fitting being longitudinally slidable in said socket with its inner end adapted to overlie said reel seat to clamp the base plate of a fishing reel upon said reel seat, and means for locking said units together in reel-plate clamping longitudinal adjustment.

2. A fishing rod comprising an elongated flexible rod unit including an extension at one end thereof, a handle unit including an off-set reel seat, said extension being slidable longitudinally in said handle unit in a path adjacent to said reel seat and to a position overlying said reel seat, and threaded means for advancing and retracting said rod unit relative to said handle unit and said reel seat whereby a reel on said reel seat is adapted to be locked or released respectively by said rod unit.

3. A fishing rod comprising an elongate flexible rod unit including a flexible rod and an extension carried by one end of said rod, a handle unit including an off-set reel seat, said extension being slidable longitudinally in said handle unit in a path adjacent to said reel seat, and threaded means on said rod for advancing and retracting said rod unit relative to said handle unit, the rear end portion of said extension having a longitudinally inclined face adapted to overlie said reel seat to clamp one end of the base of a reel upon said seat.

4. In a fishing rod, a handle unit comprising a handle, a reel seat and a longitudinal guide, said reel seat being laterally offset from and positioned between said handle and guide, an elongated flexible rod unit including a flexible rod and an extension mounted on one end of said rod and slidable longitudinally in said guide and adapted to be projected adjacent to and in overlying relation to said reel seat, and a threaded member rotatably mounted on said extension and fitting on said guide for shifting said rod unit in said guide.

5. In a fishing rod, a handle, a reel seat off-set from said handle and adapted to support a reel base, a guide socket off-set from and projecting forwardly from said reel seat, an elongated flexible rod, an extension mounted on one end of said rod and slidable in said guide socket and adapted to overlie said reel seat to lock a reel base thereon, and means for locking said rod extension in reel-base locking longitudinal adjustment in said guide socket.

6. In a fishing rod, a handle, a reel seat off-set from said handle, a guide socket off-set from and projecting forwardly from said reel seat, an elongated flexible rod, an extension fixed on one end of said rod and slidable in said guide socket, said reel seat including longitudinal ribs at its sides and a notch at its rear end to define a reel base locating portion, the end of said extension being adapted to overlie said locating portion and clamp a reel base thereon, and means for locking said rod extension in reel-base clamping longitudinal adjustment in said guide socket.

7. In a fishing rod, a handle, a reel seat off-set from said handle, a guide socket off-set from and projecting forwardly from said reel seat, an elongated flexible rod, an extension fixedly secured to one end of said rod and slidable in said guide socket, said reel seat including a notch at its rear end adapted to receive one end of the base plate of a fishing reel, the rear end portion of said rod extension being adapted to overlie and press downwardly and rearwardly on the front of said base plate to clamp the same to said reel seat, and means for locking said rod extension in reel-base clamping longitudinal adjustment in said guide socket.

8. In a fishing rod, a handle, a reel seat off-set from said handle, a guide socket off-set from and projecting forwardly from said reel seat, an elongated flexible rod, a fitting carried by and projecting from one end of said rod and slidable in said guide socket, said reel seat including a notch at its rear end adapted to receive one end of the base plate of a fishing reel, the rear end portion of said rod fitting having a longitudinally inclined surface facing said reel seat and adapted to engage the front of said base plate, and means for locking said rod fitting in reel-base clamping longitudinal adjustment in said guide socket.

9. In a fishing rod, a handle, a reel seat, a guide, said handle, reel seat and guide constituting a unit in which said reel seat is off-set laterally, an elongated flexible rod, a rigid member secured to and projecting from one end of said rod and slidable longitudinally in said guide to project from the rear thereof and overlie said reel seat to lock a reel thereon, and a screw threaded member for advancing and retracting said rigid member.

10. In a fishing rod, a handle, a reel seat, a guide, said handle, reel seat and guide constituting a unit in which said reel seat is off-set laterally, an elongated flexible rod, a rigid member secured to and projecting from one end of said rod and slidable longitudinally in said guide to project from the rear thereof and overlie said reel seat to lock a reel thereon, said guide having a screw threaded portion and said rigid member having a circumferential groove, and a nut adjustable on said threaded guide portion and rotatably interlocked with said rigid member at said groove.

11. In a fishing rod, a unit including a pair of longitudinally spaced hand grip portions and an intermediate laterally off-set reel seat adapted to support a fishing reel, one of said grip portions having a central bore therein, a flexible rod, an extension mounted on one end of said rod and slidable longitudinally in said bore and adapted to project rearwardly in reel-clamping relation to said reel seat, and means for locking said rod and extension in reel-clamping longitudinal adjustment on said unit.

12. In a fishing rod, a unit comprising longitudinally spaced handle and tubular guide portions and an intermediate laterally off-set reel seat, said guide portion being externally screw threaded at its outer end, a hand grip fitting around said guide portion and having a large diameter bore portion defining an annular groove around the screw threads of said guide portion, a rod fitting snugly and slidably in said guide portion and adapted to project rearwardly therefrom, and a nut rotatably anchored to said rod and projecting into said groove for engagement with said threaded guide portion.

13. In combination with a fishing rod, a handle having a reel seat and provided with a socket adapted to receive the end of the rod, a plunger part coupled with the rod and shiftable through the socket, and means movable over the rod and adjustably engaged within the socket operable to urge the plunger part to project beyond the socket and overhang the reel seat and lock a reel base thereon.

14. A fishing rod assembly comprising a handle having a reel seat and provided with a socket portion extending forwardly therefrom, a rod having an end portion receivable within the socket, and means coupled with the rod and adjustably threaded into the socket, said means adapted to urge the end portion of the rod to project rearwardly from the socket over the reel seat to engage a reel base mounted upon the seat to releasably secure the reel thereto.

15. A fishing rod assmbly comprising a handle having a reel seat and provided with a socket portion extending forwardly therefrom, a rod having an end portion receivable within the socket, and means coupled with the rod and adjustably threaded into the socket, said means adapted to urge the end portion of the rod to project rearwardly from the socket over the reel seat to engage a reel base mounted upon the seat to releasably secure the reel thereto, said end portion of the rod having its rear end provided with a beveled face adapted to engage a reel base disposed at different heights above the reel seat of the handle.

16. A fishing rod assembly comprising, in combination, a handle having a reel seat and provided with a socket portion projecting forwardly from the seat and adapted to receive one end of the rod, a rod having one end received within the socket, a reel having a base mounted upon the reel seat, means movably encircling the rod and adjustably threaded in the outer end of the socket to hold the rod within the socket, and a part responsive to said means adapted to engage the reel base to maintain the reel upon the seat.

17. In combination, a fishing rod, a handle for the rod, said handle having a reel seat, and a reel having a base plate receivable upon said reel seat, said handle having a socket passageway extending from the reel seat through a portion of the handle forwardly of the reel seat, said rod having a rear end portion rotatable and slidable through the socket passageway to project there beyond and overhang the reel seat, and said base plate and rear end portion of the rod shaped to cooperatively engage each other to rotatably position the rod within the socket passageway when the rear end of the rod is cooperatively engaged with the reel base plate.

18. In combination, a fishing rod, a handle, said handle provided intermediate its ends with a depressed reel seat and provided with a rod receiving socket extending forwardly from the reel seat through the handle, a plate mounted upon the reel seat, said plate having an upwardly convex face, said rod having a rear end portion receivable within the socket and rotatable therein, said rear end portion provided with an upwardly concave recess adapted to engage the upwardly convex face of the plate to position the rod rotatably within the socket and definitely with respect to the plate and means coupled with the handle and with the rod operable to hold the rod within the socket with the recess in the end of the rod engaged with the convex face of the plate.

19. In combination, a fishing rod, a handle having a reel seat and provided with a socket adapted to receive the end of the rod, a plunger part coupled with the rod and receivable through the socket, and means slidable over the rod and adjustably engaged within the socket and operable to urge said plunger part to project beyond the socket and overhang the reel seat to lock a reel base thereon, said reel base and plunger part each provided with interengaging parts adapted to cooperatively engage each other to rotatably position the rod with respect to the reel base when the plunger part is urged against the reel base.

20. A fishing rod assembly comprising a handle having a reel seat and provided with a socket portion extending forwardly therefrom, a rod having an end portion receivable within the socket, means coupled with the rod and adjustably threaded into the socket, said means adapted to urge the end portion of the rod to project rearwardly from the socket over the reel seat to engage a reel base mounted upon the seat to releasably secure the reel thereto, and a reel having a base adapted to rest upon said reel seat, said reel base and end portion of the rod provided with interlocking parts adapted to cooperatively engage each other to position the rod rotatably with respect to the reel when the end portion of the rod is urged into engagement with the base.

21. In combination, a fishing rod, a handle, said handle provided intermediate its ends with a depressed reel seat having an undercut at one end, said handle having a rod receiving socket extending forwardly from the opposite end of the reel seat, the rear end portion of the rod being receivable rotatably and slidably within said socket, said rear end portion of the rod exhibiting an arcuate beveled recess on its rear end, and a nut slidable over the rod and threadedly engageable within the socket and having a part adapted to abut a cooperating part on the rod to urge the rear end of the rod beyond the socket to overhang the reel seat, and a reel having a base adapted to rest upon the reel seat of the handle, said base being upwardly convex to be cooperatively engaged within the arcuate recess in the end of the rod to lock the reel to the handle and to line up the rod with the reel.

RAYMOND H. BEYER

REFERENCES CITED

The following references are of record in the file of this patent:

UNITED STATES PATENTS

| Number | Name | Date |
|---|---|---|
| 1,843,714 | Fuller | Feb. 2, 1932 |
| 1,909,529 | Gephart | May 16, 1933 |
| 1,920,966 | Carlson | Aug. 8, 1933 |
| 2,230,229 | Benson | Feb. 4, 1941 |

FOREIGN PATENTS

| Number | Country | Date |
|---|---|---|
| 484,628 | Great Britain | May 9, 1938 |